US00RE36266E

United States Patent [19]

Gibbs

[11] E Patent Number: Re. 36,266

[45] Reissued Date of Patent: Aug. 17, 1999

[54] BOW SIGHT

[75] Inventor: Charles S. Gibbs, Roscoe, Ill.

[73] Assignee: C.S. Gibbs Corp., Roscoe, Ill.

[21] Appl. No.: 08/792,660

[22] Filed: Jan. 31, 1997

Related U.S. Patent Documents

Reissue of:

[64] Patent No.: 5,384,966
Issued: Jan. 31, 1995
Appl. No.: 08/073,315
Filed: Jun. 8, 1993

[51] Int. Cl.[6] ..... F41G 1/467

[52] U.S. Cl. ..... 33/265; 124/87

[58] Field of Search ..... 33/265; 124/87

[56] References Cited

U.S. PATENT DOCUMENTS

| | | | |
|---|---|---|---|
| 3,574,944 | 4/1971 | Reynolds | 33/265 |
| 3,822,479 | 7/1974 | Kowalski | 33/265 |
| 4,020,560 | 5/1977 | Heck | 33/265 |
| 4,543,728 | 10/1985 | Kowalski | 33/265 |
| 4,584,777 | 4/1986 | Saunders | 33/265 |
| 5,174,269 | 12/1992 | Sappington | 33/265 |

OTHER PUBLICATIONS

Brouchure (1 page), 1988, Chek-It Products, Inc. (SG-1000 Tournament Sight).

Advertisement (1 page), date unknown, Chek-It Products, Inc. (S-9000 Tournament Sight).

*Primary Examiner*—G. Bradley Bennett
*Attorney, Agent, or Firm*—Leydig, Voit & Mayer, Ltd.

[57] ABSTRACT

A bow sight includes an elevation block which may be operably coupled to and uncoupled from an adjusting screw by a locking member which need not be held manually in either its locking position or its unlocking position. The elevation block is supported rigidly on the frame of the sight by a three-point suspension and carries a windage block which also is rigidly supported by a three-point suspension. The outer end of the windage block is formed with a half-dovetail connector which coacts with a complementary half-dovetail connector on a sighting device to enable the sighting device to be clamped rigidly to the windage block by a single screw.

26 Claims, 4 Drawing Sheets

FIG. 4
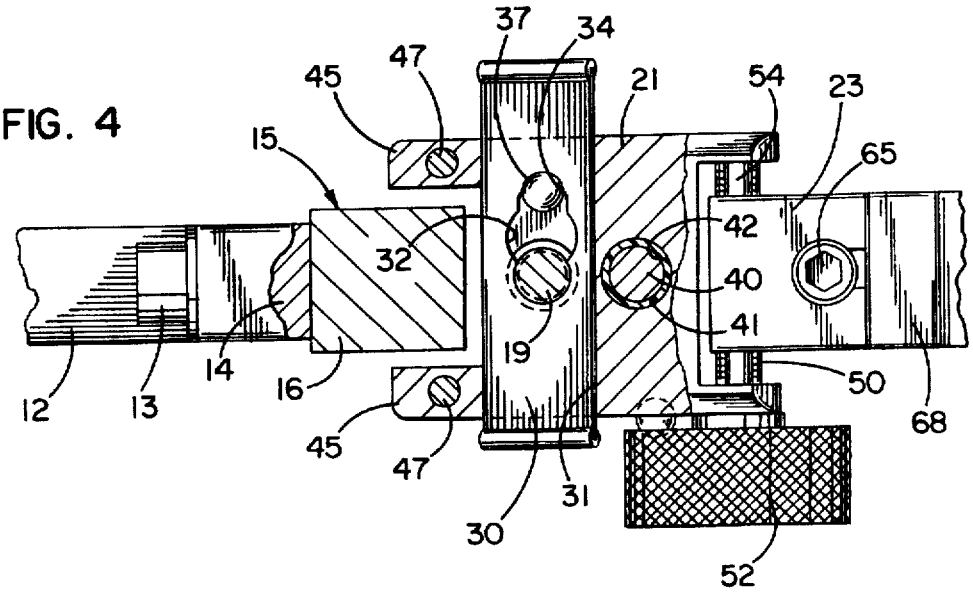
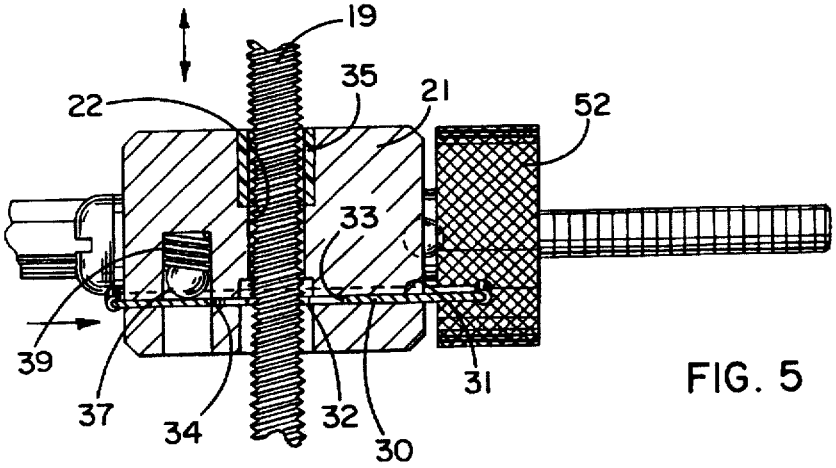
FIG. 5
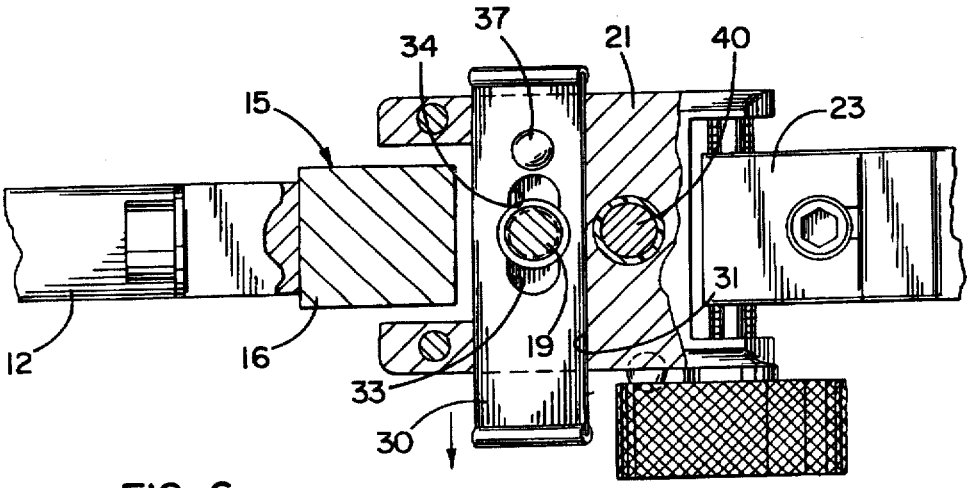
FIG. 6

BOW SIGHT

Matter enclosed in heavy brackets [ ] appears in the original patent but forms no part of this reissue specification; matter printed in italics indicates the additions made by reissue.

BACKGROUND OF THE INVENTION

This invention relates to a bow sight for archery bows. A bow sight having some similarity to that of the present invention is disclosed in Heck U.S. Pat. No. 4,020,560.

In the bow sight disclosed in the Heck patent, a generally C-shaped frame supports a rotatable lead screw which carries an elevation block adapted to move upwardly and downwardly along the lead screw. Although not disclosed in the Heck patent, many sights include a windage block which is supported by the elevation block to move horizontally and transversely of the screw. Various types of sighting devices such as a scope sight or a pin sight are adapted to be attached releasably to the windage block. By adjusting the elevation block vertically along the screw, the sighting device may be moved to an appropriate vertical position to take into account the distance to the target. By adjusting the windage block horizontally relative to the elevation block, the sighting device may be positioned to compensate for wind conditions.

In the bow sight of the Heck patent, the elevation block is releasably coupled to the lead screw and, when coupled, rotation of the screw effects fine adjustment of the vertical position of the elevation block. By either depressing a spring-loaded plunger inwardly or pulling the plunger outwardly, the elevation block may be uncoupled from the screw and moved rapidly along the screw to a roughly established new position. During rapid adjustment of the elevation block, it is necessary to manually hold the plunger in a released position.

SUMMARY OF THE INVENTION

One object of the present invention is to provide a new and improved bow sight in which an elevation block may be moved rapidly along a fine adjustment screw without need of manually holding a coupling/uncoupling device in an uncoupled position during the adjustment.

A further object is to provide an extremely precise sight which is achieved in part by providing a unique and tight but slidable three-point stabilizing mounting of the elevation block on the frame.

Another object is to increase the preciseness of the sight by providing a unique and tight but slidable three-point stabilization mounting of the windage block on the elevation block.

The invention also resides in the novel dovetail construction of the windage block and a sighting attachment to enable the latter to be clamped securely and precisely to the windage block with a single screw which is subjected to only relatively low stress.

These and other objects and advantages of the invention will become more apparent from the following detailed description when taken in conjunction with the accompanying drawings.

BRIEF DESCRIPTION OF THE DRAWINGS

FIGS. 3 and 4 are enlarged fragmentary cross-sections taken substantially along the lines 3—3 and 4—4, respectively, of FIG. 2.

FIGS. 5 and 6 are views similar to FIGS. 3 and 4, respectively, but show certain components in moved positions.

DETAILED DESCRIPTION OF THE PREFERRED EMBODIMENT

Figure 1:
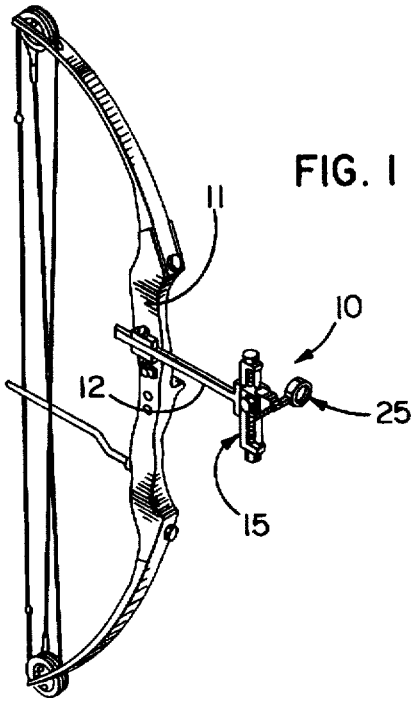
FIG. 1 is a perspective view of a typical archery bow equipped with a new and improved bow sight incorporating the unique features of the present invention.
Figure 2:
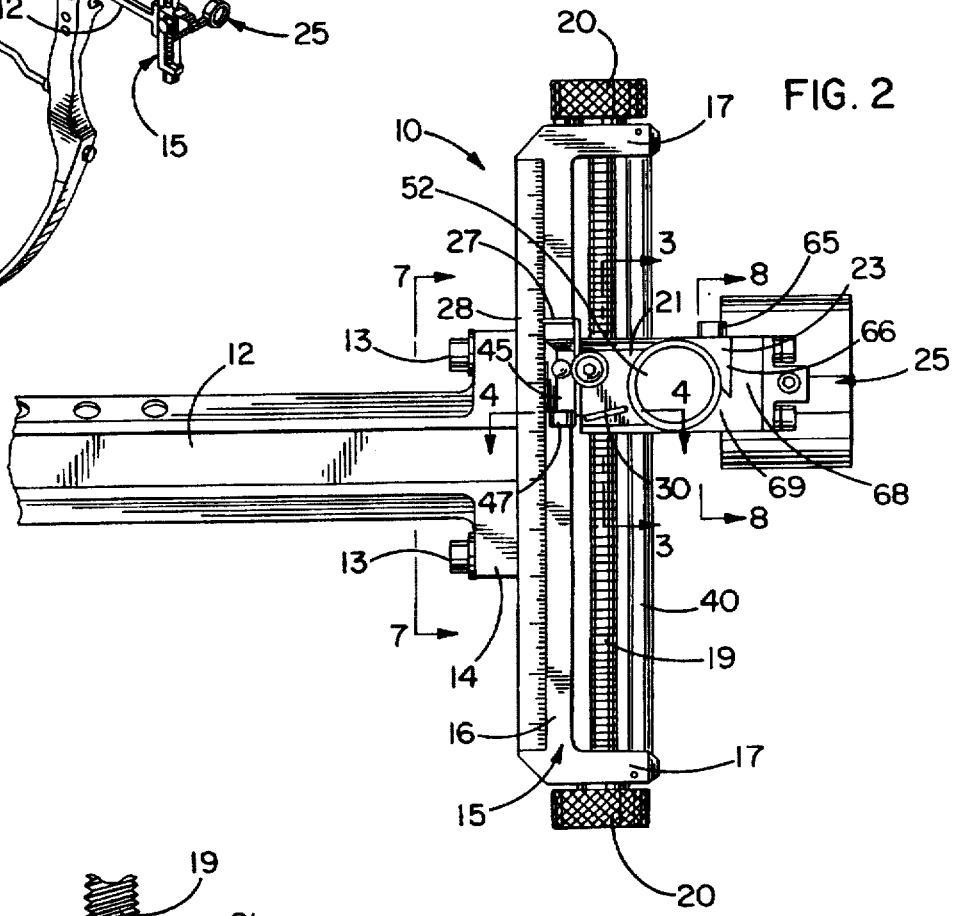
FIG. 2 is an enlarged side elevational view of the bow sight shown in FIG. 1.

As shown in the drawings for purposes of illustration, the invention is embodied in a bow sight 10 for use with an archery bow 11 to assist the archer in shooting an arrow at a precise spot on a target. Herein, the major components of the sight are machined from aluminum, one such component being an elongated support element or bar 12 which is adapted to be releasably attached to the bow and which extends outwardly from the bow in the general direction of the target.

Attached by screws 13 to a flange 14 on the outer end of the support bar 12 is a frame 15 which is in the form of a generally C-shaped yoke. The yoke includes an upright column 16 whose upper and lower ends are formed with integral and outwardly projecting legs 17. Rotatably journaled by the legs are the end portions of a vertically extending lead screw 19 which is spaced outwardly from the column 16. Knurled adjusting knobs 20 are secured to the extreme ends of the screw and may be manually turned to rotate the screw.

Figure 3:
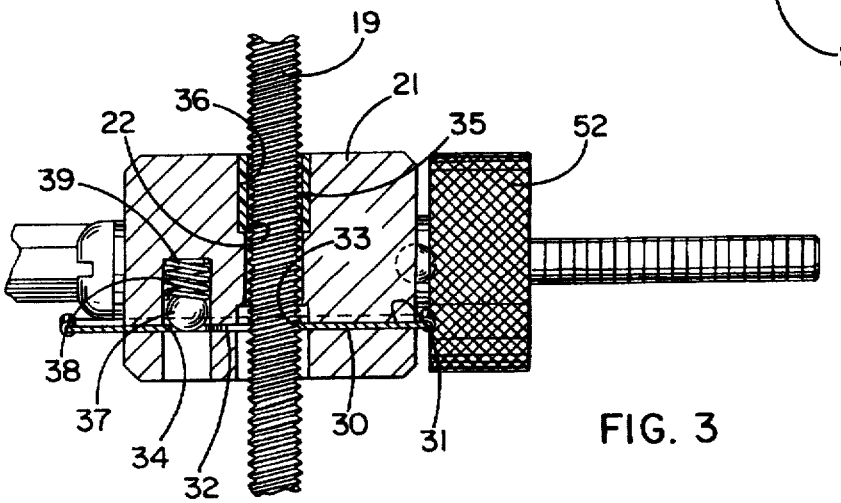
Figure 7:
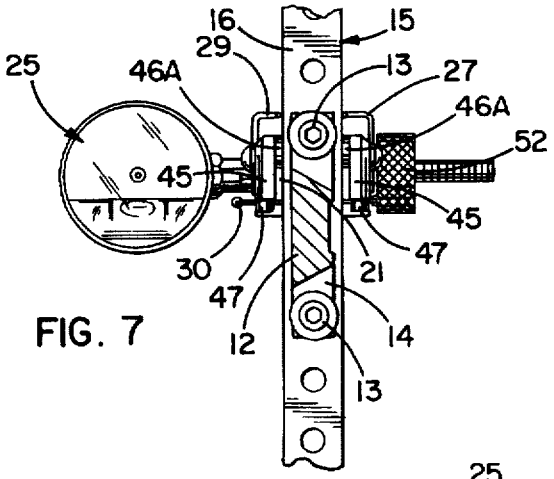
FIG. 7 is a fragmentary cross-section taken substantially along the line 7—7 of FIG. 2.
Figure 10:
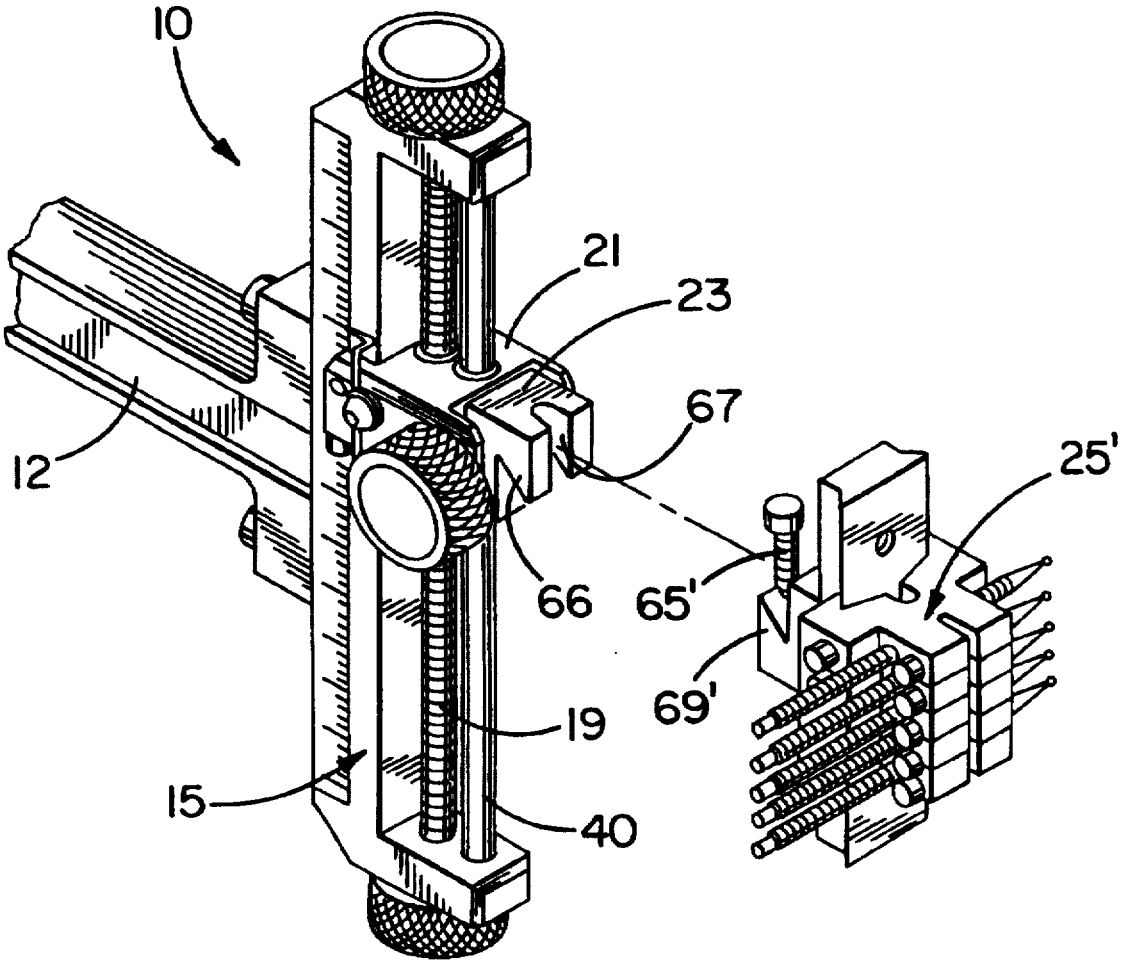
FIG. 10 is an exploded perspective view showing the bow sight equipped with a different type of sighting device.

An elevation block 21 having an unthreaded central bore 22 (FIG. 3) is mounted for up and down adjustment along the screw 19 and carries a windage block 23 which is supported on the elevation block to move horizontally back and forth along a coordinate extending transversely of the bow 11 and perpendicular to the screw 19. A sighting device 25 is carried by and moves with the windage block 23. One type of sighting device is a scope as shown in FIGS. 1, 2 and 7–9. Another type of sighting device 25' is shown in FIG. 10 and is a pin sight. The devices 25 and 25' and other types of sighting devices may be used interchangeably with the sight 10.

By adjusting the windage block 23 horizontally on the elevation block 21, the horizontal position of the sighting device 25, 25' may be changed to take into account the existing wind condition. By adjusting the elevation block upwardly and downwardly along the screw 19, the vertical position of the sighting device may be set in accordance with the distance to the target. A pointer 27 (FIG. 2) is affixed to one side of the elevation block and coacts with a scale 28 on the adjacent side of the column 16 to indicate the vertical position of the elevation block. Another pointer 29 (FIG. 7) is fixed to the opposite side of the elevation block and coacts with an adhesive strip (not shown) on the opposite side of the column. The archer may make an individualized scale on the adhesive strip.

The elevation block 21 is adapted to be threadably coupled to the screw 19 so that the block may be adjusted in fine increments along the screw when the latter is rotated by turning one of the knobs 20. In addition, the block 21 is adapted to be uncoupled from and moved rapidly along the screw in order to enable the block to be moved through a wide range of positions in a short time interval.

According to one aspect of the present invention, provision is made of a relatively simple manually operable member 30 for selectively coupling the elevation block 21 to and uncoupling the block from the screw 19, the device being particularly characterized in that it need not be manually manipulated or held while the block is being adjusted rapidly along the screw. Herein, the coupling/uncoupling member is in the form of a flat and relatively narrow plate or blade which is supported in a slot 31 (FIG. 3) in the block 21 to slide back and forth between active and inactive positions along a coordinate extending transversely of the bow 11. The central portion of the blade 30 is formed with an elongated opening or slot having a relatively large diameter central portion 32 (FIG. 4) with arcuate edges and having two smaller end portions 33 and 34 (FIG. 6) each having two opposing straight edges interconnected by an arcuate edge.

When the blade 30 is in an inactive or unlocking position as shown in FIGS. 5 and 6, the screw 19 is encircled by the edge of the relatively large slot portion 32 but with substantial radial clearance so that the block 21 is free to slide rapidly upwardly and downwardly on the screw. When the blade is pushed longitudinally to an active or locking position shown in FIGS. 3 and 4, the edges of the end portion 33 of the slot mate with the thread of the screw and define a thread section which operably couples the block 21 to the screw. Accordingly, rotation of the screw produces fine vertical adjustment of the block. To enable the edges of the slot end portion 33 to mate with the screw thread, the blade and the slot 30 in the block are inclined from horizontal at an angle correlated with the lead angle of the screw (see FIG. 2). A nylon bushing 35 in a counterbore 36 at the upper end of the bore 22 slidably engages the screw to help stabilize the block 21 as the latter is adjusted along the screw. The heads of screws 47 (FIG. 7) captivate the blade rearwardly in the slot 31 and prevent the blade from shifting rearwardly.

In carrying out the invention, detent means hold the locking blade 30 both in its active locking position and in its inactive unlocking position. Herein, the detent means comprise a spherical ball 37 (FIG. 3) located in a blind hole 38 in the lower end portion of the block 21. A coil spring 39 is compressed between the ball and the closed end of the hole and urges the ball downwardly toward the blade. When the blade is in its active or locking position (FIGS. 3 and 4), the ball engages the arcuate edges of the slot end portion 34 and coacts therewith to positively restrict left-to-right (FIG. 3) movement of the blade to its inactive or unlocking position. Thus, the ball seats partially in the slot end portion 34 and positively detents the blade so that the edges of the slot end portion 33 remain in secure engagement with the screw 19. By forcibly pushing on one end of the blade to shift the blade from left-to-right as viewed in FIG. 3, the curved edge of the slot end portion 34 cams the ball 37 out of the slot against the bias of the spring 39 and allows the blade to shift to its inactive position (FIGS. 5 and 6) in which the enlarged center slot portion 32 clears the screw to allow rapid adjustment of the block 21. When the blade is in its inactive position, the spring 39 presses the ball 37 into frictional engagement with the upper side of the blade so as to resist movement of the blade back to its active position. Thus, there is no need to manually hold the blade during rapid adjustment of the block. Once that adjustment has been completed, the archer may push on the opposite end of the blade to overcome the friction between the ball and the blade and to return the blade to its active position.

In accordance with another feature of the invention, the elevation block 21 is very solidly and precisely supported on the yoke 15 in such a manner as to prevent movement of the block in any direction except upwardly and downwardly along the axis of the screw 19. For this purpose, a vertically extending guide rod 40 is spaced outwardly from the screw and its end portions are fixed rigidly to the legs 17. The rod is received with a slidable fit by nylon bushings 41 (FIG. 4) which are located within the end portions of a vertically extending bore 42 formed through the block. The rod positively prevents the block from pivoting in any direction about mutually perpendicular horizontal axes, one of which extends transversely of the bow 11, in spite of any tolerance variations between the screw 19 and the bushing 35.

Figure 7A:
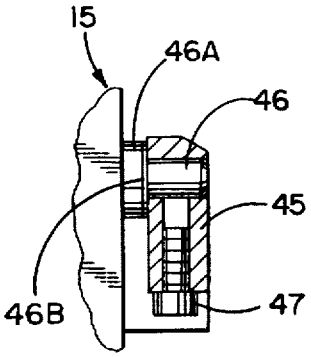
FIG. 7A is an enlarged view of components shown in FIG. 7 with certain part being broken away and shown in section.
Figure 8:
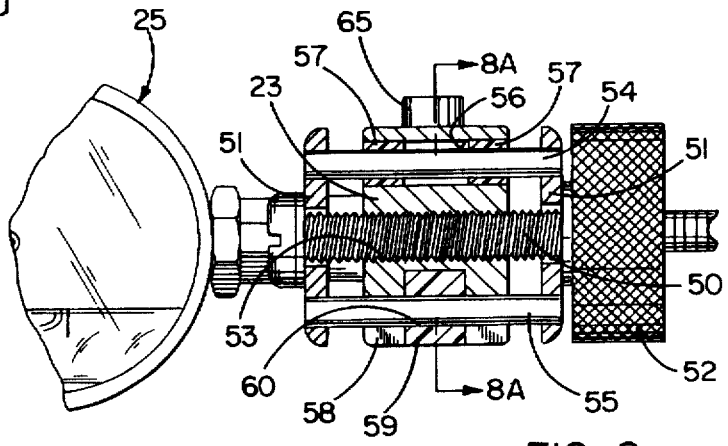
FIG. 8 is an enlarged fragmentary cross-section taken substantially long the line 8—8 of FIG. 2.
Figure 9:
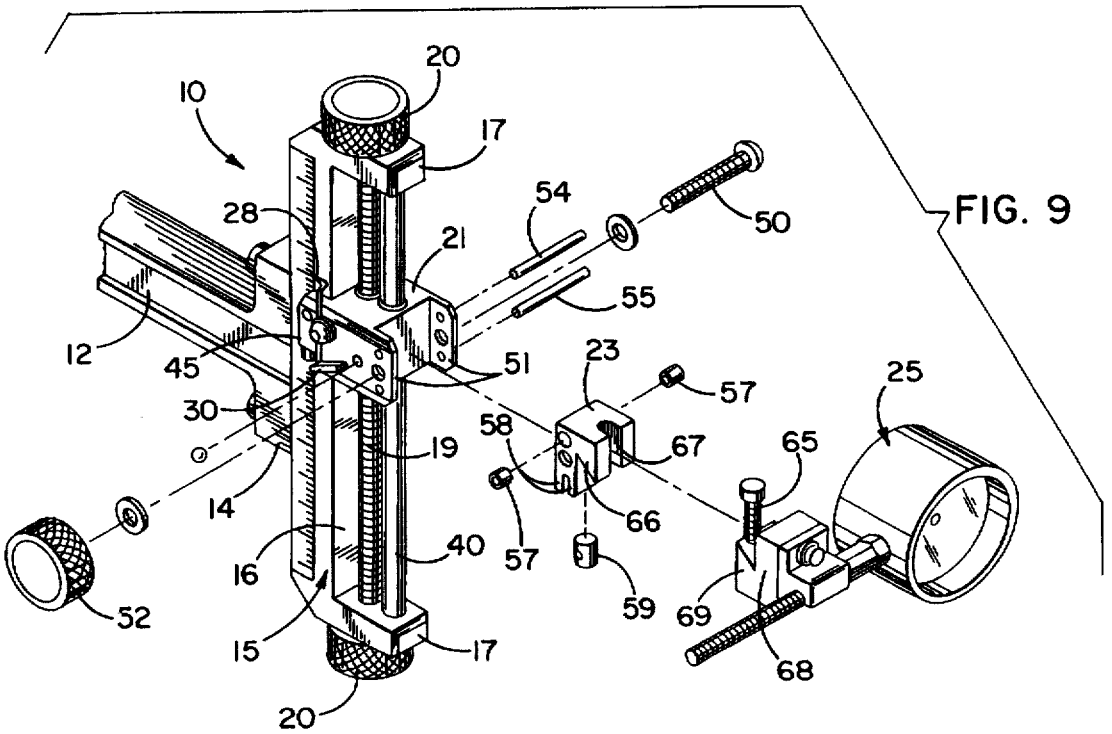
FIG. 9 is an exploded perspective view of certain components of the bow sight.

The rod 40 also tends to prevent the block 21 from pivoting in either direction about a vertical axis. The block and the column 16 coact to further insure against the block turning about a vertical axis and about a horizontal axis extending longitudinally of the bow 11. To this end, the inner end of the block is formed with a pair of transversely spaced and inwardly projecting flanges 45 (FIGS. 4 and 7) which straddle the sides of the column. Hard plastic pins 46 (FIG. 7A) are fitted slidably in holes in the flanges 45 and are formed with friction reducing wear elements in the form of enlarged heads 46A which engage and slide along the sides of the column. Belleville washers 46B are located between the heads 46A and the inboard sides of the flanges to take up tolerances. The heads 46A thus tightly but slidably engage the sides of the column and coact with the rod 40 to prevent the block 21 from turning about a vertical axis and about a horizontal axis extending longitudinally of the bow. Accordingly, the block is slidably but rigidly supported by a three-point suspension defined by the rod 40 and the two sides of the column 16. It should be appreciated that similar results could be achieved by means of the rod 40 and a vertically extending tongue-and-groove connection between the inner side of the block 21 and the outer side of the column 16.

The invention also contemplates a rigid but slidable three-point suspension mounting for attaching the windage block 23 to the elevation block 21. As shown most clearly in FIG. 8, a transversely extending screw 50 is rotatably supported by transversely spaced ears 51 formed integrally with and projecting outwardly from the outer end of the elevation block 21, there being a knurled knob 52 on one end of the screw for turning the latter. A threaded bore 53 is formed through the center of the windage block and receives the screw 50 so that, when the screw is turned, the windage block translates along the screw.

Pursuant to the invention, upper and lower parallel horizontal rods 54 and 55 (FIG. 8) are secured to and extend transversely between the ears 51. A bore 56 in the upper end portion of the windage block 23 tightly receives a pair of transversely spaced nylon bushings 57 which are slidably mounted on the upper rod 54.

Figure 8A:
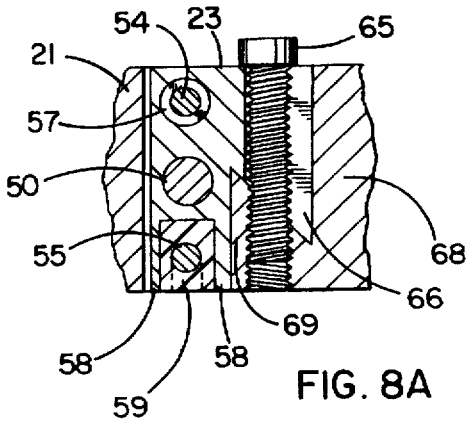
FIG. 8A is a fragmentary cross-section taken substantially along the line 8A—8A of FIG. 8.

The lower end portion of the windage block 23 is defined by inner and outer depending legs 58 (FIGS. 8, 8A and 9) which straddle the lower rod 55, the legs being formed by milling a slot in the lower end of the windage block. A nylon bushing 59 (FIGS. 8 and 9) is received between the legs 58 with a slidable fit and is formed with a hole 60 which slidably receives the lower rod 55.

With the foregoing arrangement, the windage block 23 is free to slide back and forth along the rods 54 and 55 when the screw 50 is turned by the knob 52. The upper rod 54 serves as a guide rod and prevents the windage block from turning about a vertical axis and about a horizontal axis extending longitudinally of the bow 11. The lower rod 55 and the bushing 59 prevent the windage block from pivoting about the horizontal axis of the screw 50 in spite of any play between the threads of the screw and the threads of the bore 53. At the same time, the split legs 58 and the bushing 59 permit assembly of the various components of the windage block 23 and permit precise assembly of the windage block to the elevation block 21 in spite of accumulated tolerance variations in the components.

The sighting devices 25, 25' are adapted to be mounted on the outer end portion of the windage block 23. In accordance with another aspect of the invention, the windage block and the sighting devices are uniquely constructed to enable a sighting device to be tightly and precisely clamped to the windage block by a single screw 65 and without the imposition of excessive stress on the screw.

For this purpose, the outer end portion of the windage block 23 is formed with a half-dovetail connector 66 (FIGS. 2, 9 and 10), that is, a generally V-shaped notch which opens downwardly. A vertically extending slot 67 (FIG. 9) for receiving the shank of the screw 65 is formed in the connector 66 and opens out of the outer end thereof.

The scope 25 includes a mounting block 68 (FIG. 9) formed with a half-dovetail connector 69 which is complementary to and is adapted to mate tightly with the connector 66. The connector 69 also is defined by a generally V-shaped notch but that notch opens upwardly. The screw 65 is threaded into a tapped hole in the upwardly facing surface of the connector 69.

To connect the scope 25 to the windage block 23, it is necessary only to slip the half-dovetail connector 69 of the scope upwardly into mating engagement with the half-dovetail connector 66 of the block. As an incident thereto, the shank of the screw 65 slips into the slot 67. Thereafter, the screw is tightened and, as the head of the screw engages the upper side of the windage block 23, the connector 69 is drawn upwardly into wedging engagement with the connector 66. With this arrangement, a tight clamp may be effected by the single screw 65 without overstressing the screw. The same principle applies to the pin sight 25 of FIG. 10, that sighting device being provided with a half-dovetail connector 69' identical to the connector 69 and with a screw 65' identical to the screw 65.

I claim:

1. A sight for an archery bow, said sight comprising an elongated support element attachable to the bow and extending outwardly from the bow in the general direction of a target, a generally vertically extending frame attached to said support element, a generally vertically extending lead screw supported by said frame, an elevation block embracing said lead screw, a member mounted to slide in said block and transversely of said screw between active and inactive positions, a hole in said member receiving said screw, said hole having edges shaped to engage said screw and threadably couple said block to said screw when said member is in said active position, said edges being shaped to release said screw and permit said block to slide along said screw when said member is in said inactive position, spring-loaded detent means for selectively holding said member both in said active position and in said inactive position, and a sighting device movable with said block.

2. A sight as defined in claim 1 in which said detent means positively holds said member in said active position and frictionally holds said member in said inactive position.

3. A sight as defined in claim 2 in which said detent means comprises a spring-loaded ball, a portion of said hole receiving said ball when said member is in said active position, said ball being free of said hole and pressing frictionally against said member when said member is in said inactive position.

4. A sight as defined in claim 1 in which said detent means comprises a spring-loaded ball, a portion of said hole receiving said ball when said member is in said active position.

5. A sight as defined in claim 1 in which said frame is a generally C-shaped yoke having an upright column and having two legs extending outwardly from the ends of said column in the general direction of the target, said screw being spaced outwardly from said column, a guide rod supported by said legs and spaced outwardly from and extending parallel to said screw, said rod extending through said elevation block so as to guide the latter for up and down sliding between said legs, said rod preventing said elevation block from turning relative to said screw in any direction about mutually perpendicular horizontal axes, and coacting engageable means on said column and said elevation block for preventing said elevation block from turning relative to said screw in either direction about a vertical axis while permitting said elevation block to move upwardly and downwardly along said screw and said rod.

6. A sight as defined in claim 5 in which said coacting engageable means comprise outboard sides of said column and further comprise laterally spaced flanges projecting inwardly from said block and straddling the outboard sides of said column.

7. A sight as defined in claim 6 in which said coacting engageable means further comprise friction-reducing wear elements carried by said flanges and positioned to engage and ride along the outboard sides of said column.

8. A sight as defined in claim 1 further including a windage block having inner and outer downwardly extending legs, upper and lower transversely extending and vertically spaced parallel rods supported by said elevation block, said upper rod guiding said windage block for transverse movement relative to said elevation block and preventing said windage block from turning relative to said elevation block in either direction about a vertical axis and about a first horizontal axis extending perpendicular to said vertical axis, said legs straddling said lower rod, and means coacting with said legs and said lower rod to prevent said windage block from turning relative to said elevation block in either direction about a second horizontal axis extending perpendicular to said first horizontal axis.

9. A sight as defined in claim 8 in which said coacting means comprise a bushing slidable along said lower rod and received with a slidable fit between said legs.

10. A sight as defined in claim 1 further including a windage block having an outer end portion, means on said elevation block for mounting said windage block for transverse movement relative to said elevation block, the outer end portion of said windage block having a first half-dovetail connector with a slot extending vertically therethrough and opening out of the outer end thereof, said sighting device having a second half-dovetail connector shaped to mate in a complementary manner with said first connector, and an attaching screw threaded into said second connector, having a shank received in said slot and having a head positioned to be clamped against said first connector when said screw is tightened.

11. A sight for an archery bow, said sight comprising an elongated support element attachable to and extending outwardly from the bow in the general direction of a target, a generally C-shaped yoke attached to said support element and having a generally vertically extending column, said yoke having two legs extending outwardly from the ends of the column in the general direction of the target, a generally vertically extending lead screw spaced outwardly from said column and rotatably supported by said legs, an elevation block embracing said lead screw and movable upwardly and downwardly therealong, a sighting device movable with said elevation block, a guide rod supported by said legs and spaced outwardly from and extending parallel to said screw, said rod extending through said elevation block so as to guide the latter for up and down sliding between said legs, said rod preventing said block from turning relative to said screw in any direction about mutually perpendicular horizontal axes, and coacting engageable means on said column and said elevation block for permanently preventing said elevation block from turning relative to said screw in either direction about a vertical axis while permitting said elevation block to move upwardly and downwardly along said screw and said rod.

12. A sight as defined in claim 11 in which said coacting engageable means comprise outboard sides of said column and further comprise laterally spaced flanges projecting inwardly from said block and straddling the outboard sides of said column.

13. A sight as defined claim 12 in which said coacting engageable means further comprise friction-reducing wear elements carried by said flanges and positioned to engage and ride along the outboard sides of said column.

14. A sight as defined in claim 11 further including a windage block having inner and outer downwardly extending legs, upper and lower transversely extending and vertically spaced parallel rods supported by said elevation block, said upper rod guiding said windage block for transverse movement relative to said elevation block and preventing said windage block from turning relative to said elevation block in either direction about a vertical axis and about a first horizontal axis extending perpendicular to said vertical axis, said legs straddling said lower rod, and means coacting with said lower rod and with the legs of the windage block to prevent said windage block from turning relative to said elevation block in either direction about a second horizontal axis extending perpendicular to said first horizontal axis.

15. A sight as defined in claim 14 further including a member mounted to Slide in said elevation block and transversely of said screw between active and inactive positions, a hole in said member receiving said screw, said hole having edges shaped to engage said screw and threadably couple said elevation block to said screw when said member is in said active position, said edges being shaped to release said screw and permit side elevation block to slide along said screw when said member is in said inactive position, and spring-loaded detent means for selectively holding said member both in said active position and in said inactive position.

16. A sight as defined in claim 11 further including a windage block having an outer end portion, means on said elevation block for mounting said windage block for transverse movement relative to said elevation block, the outer end portion of said windage block having a first half-dovetail connector with a slot extending vertically therethrough and opening out of the outer end thereof, said sighting device having a second half-dovetail connector shaped to mate in a complementary manner with said first connector, and an attaching screw threaded into said second connector, having a shank received in said slot and having a head positioned to be clamped against said first connector when said screw is tightened.

17. A sight for an archery bow, said sight comprising an elongated support element attachable to the bow and extending outwardly from the bow in the general direction of a target, a generally vertically extending frame attached to said support element, a generally vertically extending lead screw supported by said frame, an elevation block embracing said lead screw and movable upwardly and downwardly therealong, a windage block having inner and outer downwardly extending legs, upper and lower transversely extending and vertically spaced parallel rods supported by said elevation block, said upper rod guiding said windage block for transverse movement relative to said elevation block and preventing said windage block from turning relative to said elevation block in either direction about a vertical axis and about a first horizontal axis extending perpendicular to said vertical axis, said legs straddling said lower rod, means coacting with said legs and said lower rod to prevent said windage block from turning relative to said elevation block in either direction about a second horizontal axis extending perpendicular to said first horizontal axis, and a sighting device carried by said windage block.

18. A sight as defined in claim 17 in which said coacting means comprise a bushing slidable along said lower rod and received with a slidable fit between said legs.

19. A sight as defined in claim 17 in which said windage block includes an outer end portion having a first half-dovetail connector with a slot extending vertically therethrough and opening out of the outer end thereof, and said sighting device having a second half-dovetail connector shaped to mate in a complementary manner with said first connector, and an attaching screw threaded into said second connector, having a shank received in said slot and having a head positioned to be clamped against said first connector when said screw is tightened.

20. A sight as defined in claim 19 further including a member mounted to slide in said elevation block and transversely of said screw between active and inactive positions, a hole in said member and receiving said screw, said hole having edges shaped to engage said screw and threadably couple said elevation block to said screw when said member is in said active position, said edges being shaped to release said screw and permit said elevation block to slide along said screw when said member is in said active position, and spring-loaded detent means for selectively holding said member both in said active position and in said inactive position.

21. A sight for an archery bow, said sight comprising an elongated support element attachable to the bow and extending outwardly from the bow in the general direction of a target, a generally vertically extending frame attached to said support element, a generally vertically extending lead screw supported by said frame, an elevation block embracing said lead screw and movable upwardly and downwardly therealong, a windage block having an outer end portion, means on said elevation block for mounting said windage block for transverse movement relative to said elevation block, the outer end portion of said windage block having a first half-dovetail connector with a slot extending vertically therethrough and opening out of the outer end thereof, a sighting device having a second half-dovetail connector shaped to mate with said first connector, and an attaching screw threaded into said second connector, having a shank received in said slot and having a head positioned to be clamped against said first connector when said screw is tightened.

22. A sight for an archery bow, said sight comprising an elongated support element attachable to and extending outwardly from the bow in the general direction of a target, a generally C-shaped yoke attached to said support element and having a generally vertically extending column, said yoke having two legs extending outwardly from the ends of the column in the general direction of the target, a generally vertically extending lead screw spaced outwardly from said column and rotatably supported by said legs, an elevation block embracing said lead screw and movable upwardly and downwardly therealong, a member mounted to slide in said block and transversely of said screw between active and inactive positions, a hole in said member receiving said screw, said hole having edges shaped to engage said screw and threadably couple said block to said screw when said member is in said active position, said edges being shaped to release said screw and permit said block to slide along said screw when said member is in said inactive position, spring-loaded detent means for selectively holding said member both in said active position and in said inactive position, a guide rod supported by said legs and spaced outwardly from and extending parallel to said screw, said rod extending through said sight block so as to guide the latter for up and down sliding between said legs, said rod preventing said block from turning relative to said screw in any direction about mutually perpendicular horizontal axes, coacting engageable means on said column and said block for preventing said block from turning relative to said screw in either direction about a vertical axis while permitting said block to move upwardly and downwardly along said screw and said rod, a windage block having inner and outer downwardly extending legs, upper and lower transversely extending and vertically spaced parallel rods supported by said elevation block, said upper rod guiding said windage block for transverse movement relative to said elevation block and preventing said windage block from turning relative to said elevation block in either direction about a vertical axis and about a first horizontal axis extending perpendicular to said vertical axis, said legs of said windage block straddling said lower rod, means coacting with said lower rod and the legs of said windage block for preventing said windage block from turning relative to said elevation block in either direction about a second horizontal axis extending perpendicular to said first horizontal axis, said windage block having an outer end portion, the outer end portion of said windage block having a first half-dovetail connector with a slot extending vertically therethrough and opening out of the outer end thereof, a sighting device having a second half-dovetail connector shaped to mate with said first connector, and an attaching screw threaded into said second connector, having a shank received in said slot and having a head positioned to be clamped against said first connector when said screw is tightened.

*23. A sight for an archery bow, said sight comprising an elongated support element attachable to and extending outwardly from the bow in the general direction of a target, a generally C-shaped yoke attached to said support element and having a generally vertically extending column, said yoke having two legs extending outwardly from the ends of the column in the general direction of the target, a generally vertically extending lead screw spaced outwardly from said column and rotatably supported by said legs, an elevation block embracing said lead screw and movable upwardly and downwardly therealong, a sighting device movable with said elevation block, a guide rod supported by said legs and spaced from and extending parallel to said screw, said rod extending through said elevation block so as to guide the latter for up and down sliding between said legs, said rod preventing said block from turning relative to said screw in any direction about mutually perpendicular horizontal axes, and coacting engageable means on said column and said elevation block for permanently preventing said elevation block from turning relative to said screw in either direction about a vertical axis while permitting said elevation block to move upwardly and downwardly along said screw and said rod.*

*24. A three point suspension for use in a sight for an archery bow, the sight having a generally C-shaped yoke attachable to said bow, said yoke having a generally vertically extending column and two legs extending outwardly from the ends of the column, a generally vertically extending screw spaced outwardly from said column and rotatably supported by said legs, and an elevation block movable upwardly and downwardly along said screw, said three point suspension comprising a guide rod supported by said legs and spaced from and extending parallel to said column, said rod extending through said elevation block so as to guide the elevation block for up and down sliding between said legs, said rod preventing said elevation block from turning relative to said screw in any direction about mutually perpendicular horizontal axes, and coacting engageable means on said column and said elevation block for permanently preventing said elevation block from turning relative to said screw in either direction about a vertical axis while permitting said elevation block to move upwardly and downwardly along said screw and said rod.*

*25. A three-point suspension as defined in claim 24 wherein the coacting engageable means comprise outboard sides of said column and laterally spaced flanges projecting inwardly from said elevation block and straddling the outboard sides of said column.*

*26. A three-point suspension as defined in claim 24 wherein the coacting engageable means comprise a tongue projecting inwardly from said elevation block and an outer side of said column having a groove for receiving the said tongue.*

* * * * *